(12) United States Patent
Denham

(10) Patent No.: US 10,814,685 B2
(45) Date of Patent: Oct. 27, 2020

(54) AMPHIBIOUS VEHICLES

(71) Applicant: Wilco Marsh Buggies and Draglines, Inc., Harvey, LA (US)

(72) Inventor: Jeffrey C. Denham, St. Francisville, LA (US)

(73) Assignee: Wilco Marsh Buggies and Draglines, Inc., Harvey, LA (US)

( * ) Notice: Subject to any disclaimer, the term of this patent is extended or adjusted under 35 U.S.C. 154(b) by 0 days.

(21) Appl. No.: 16/516,086

(22) Filed: Jul. 18, 2019

(65) Prior Publication Data

US 2020/0023700 A1 Jan. 23, 2020

Related U.S. Application Data

(60) Provisional application No. 62/700,667, filed on Jul. 19, 2018.

(51) Int. Cl.
*B60F 3/00* (2006.01)
*B63H 19/08* (2006.01)

(52) U.S. Cl.
CPC .......... *B60F 3/0015* (2013.01); *B60F 3/0038* (2013.01)

(58) Field of Classification Search
CPC ........ B60F 3/0015; B60F 3/00; B60F 3/0007; B60F 3/003; B60F 3/0038; B60F 3/0061; B62D 55/00; B62D 55/08; B62D 55/18; B62D 55/20; B62D 55/202; B62D 55/205; B62D 55/21; B62D 55/24; B62D 55/26

USPC ........................................... 440/12.63, 12.64
See application file for complete search history.

(56) References Cited

U.S. PATENT DOCUMENTS

| | | | |
|---|---|---|---|
| 3,605,296 A | 9/1971 | Dysart | |
| 3,757,438 A | 9/1973 | Watase | |
| 3,765,367 A * | 10/1973 | Hendrickson | B60F 3/0007 440/12.56 |
| 3,951,093 A * | 4/1976 | Poche | B60F 3/0015 440/12.63 |
| 4,713,896 A * | 12/1987 | Jennens | B63H 19/08 114/312 |
| 5,027,737 A * | 7/1991 | Duffty | B60F 3/0007 440/12.54 |
| 5,181,478 A * | 1/1993 | Berardi | B60F 3/003 114/344 |
| 5,379,709 A * | 1/1995 | Wilkerson | B60F 3/0015 305/107 |
| 6,315,622 B1 | 11/2001 | Wilson, Sr. et al. | |
| 6,626,712 B1 * | 9/2003 | Bellezza Quater | B60F 3/0007 440/12.51 |
| 10,293,649 B2 * | 5/2019 | Oshima | B63B 1/32 |
| 2002/0022415 A1 * | 2/2002 | Choi | B60F 3/0015 440/12.5 |

(Continued)

*Primary Examiner* — Daniel V Venne
(74) *Attorney, Agent, or Firm* — Conley Rose, P.C.

(57) ABSTRACT

Embodiments of amphibious vehicles are disclosed herein. In one embodiment, the amphibious vehicle includes a body that defines a buoyant hull. The buoyant hull includes a bottom, and a pair of lateral sides. The bottom extends downward at the lateral sides to form a pair of pockets, and each pocket is open to atmosphere through an upper side of the hull and is closed at a lower end by the bottom of the hull. In addition, the amphibious vehicle includes a plurality of wheels mounted to the lateral sides of the body, and a pair of tracks disposed about the wheels.

21 Claims, 7 Drawing Sheets

(56) References Cited

U.S. PATENT DOCUMENTS

2009/0124142 A1\* 5/2009 Wernicke ............. B60F 3/0038
　　　　　　　　　　　　　　　　　　　　　　440/12.63
2009/0124143 A1\* 5/2009 Kanerva ................ B63C 13/00
　　　　　　　　　　　　　　　　　　　　　　440/12.63

\* cited by examiner

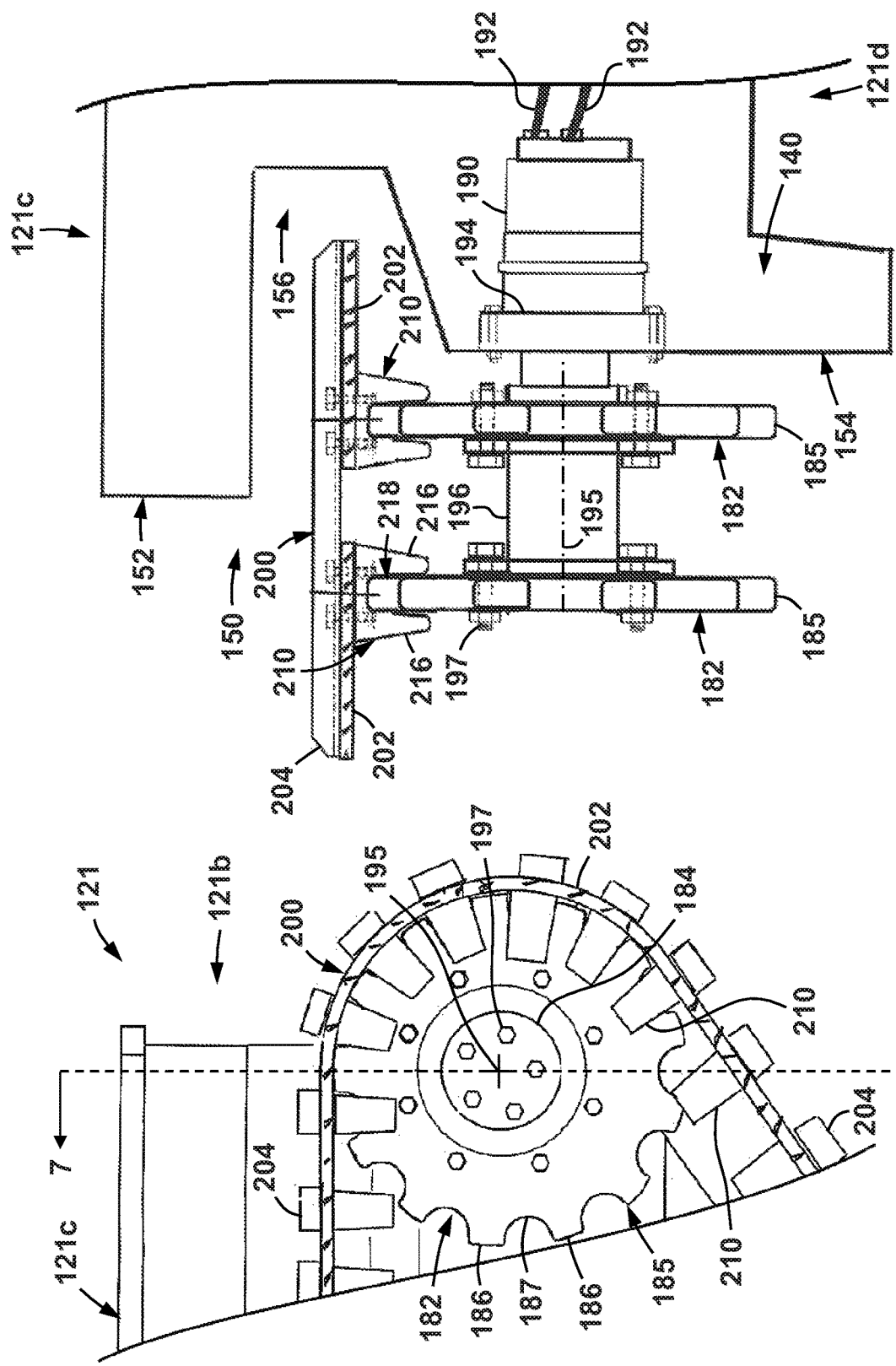

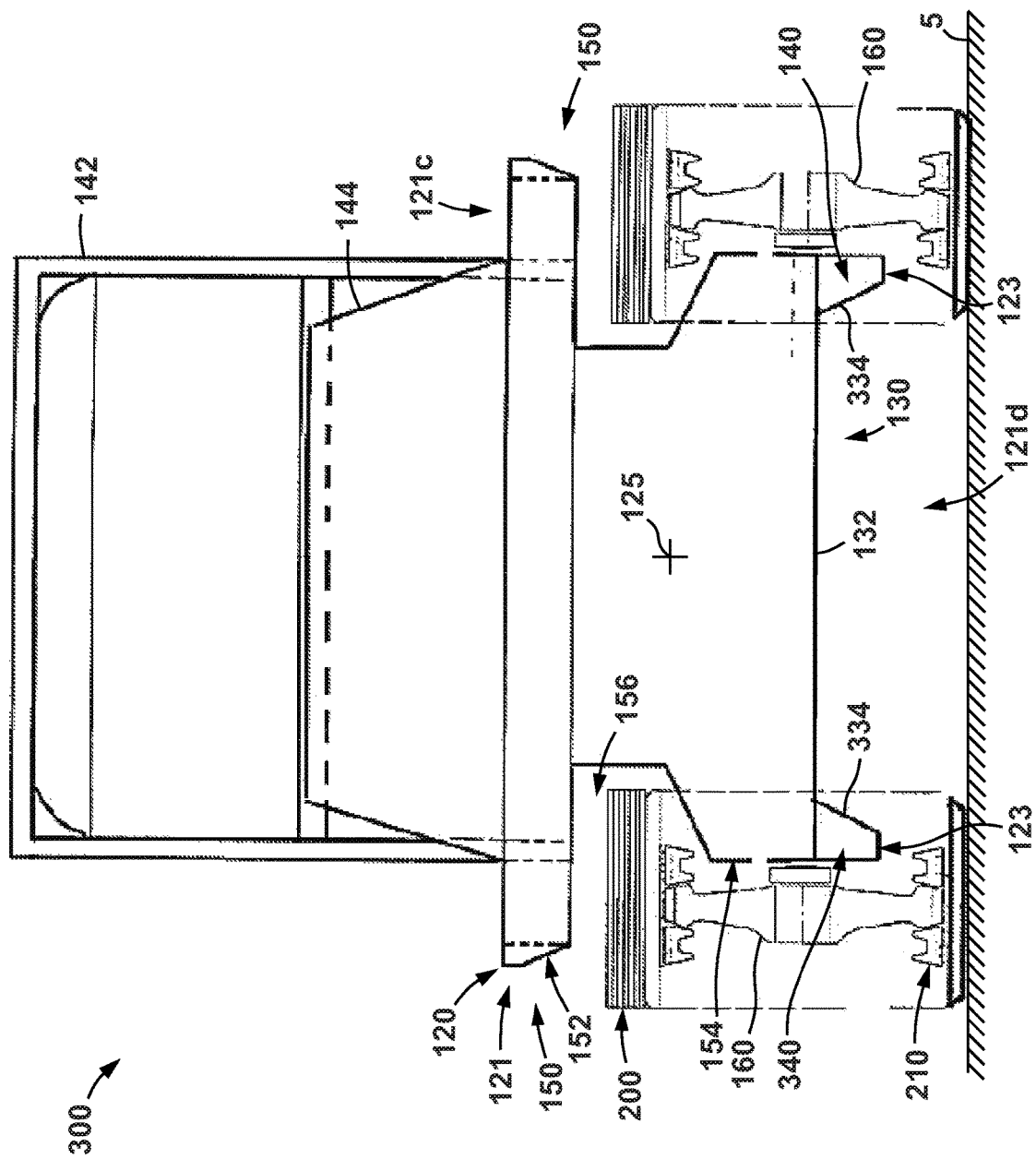

AMPHIBIOUS VEHICLES

CROSS-REFERENCE TO RELATED APPLICATIONS

This application claims benefit of U.S. provisional patent application Ser. No. 62/700,667 filed Jul. 19, 2018, and entitled "Lightweight Amphibious Vehicles," which is hereby incorporated herein by reference in its entirety.

STATEMENT REGARDING FEDERALLY SPONSORED RESEARCH OR DEVELOPMENT

Not applicable.

BACKGROUND

This disclosure relates to amphibious vehicles. More particularly, this disclosure relates to a tracked amphibious vehicles that may be utilized on different types of terrain, such as, for example, swamps, marshes, sand, mud, and the like.

Amphibious vehicles may include all-terrain vehicles (ATVs), utility task vehicles (UTVs), marsh buggies, etc. Regardless of the type, an amphibious vehicle may include one or more forms of floatation in order to prevent the vehicle from sinking when placed within a water environment.

BRIEF SUMMARY OF THE DISCLOSURE

Some embodiments disclosed herein are directed to an amphibious vehicle including a body that defines a buoyant hull. The buoyant hull includes a bottom, and a pair of lateral sides. The bottom extends downward at the lateral sides to form a pair of pockets, and each pocket is open to atmosphere through an upper side of the hull and is closed at a lower end by the bottom of the hull. In addition, the amphibious vehicle includes a plurality of wheels mounted to the lateral sides of the body, and a pair of tracks disposed about the wheels.

Other embodiments disclosed herein are directed to an amphibious vehicle including a body that defines a buoyant hull. The buoyant hull includes an open top side, a closed bottom, and a pair of lateral sides extending between the top side and the bottom. The bottom includes a planar surface and a pair of projections extending downward from the planar surface, and each of the pair of projections is disposed at the lateral sides. In addition, the amphibious vehicle includes a plurality of wheels mounted to the lateral sides of the body, and a pair of drive tracks disposed about the wheels.

Still other embodiments disclosed herein include an amphibious vehicle including a body having a longitudinal axis, a pair of lateral sides, and a bottom extending between the lateral sides. The lateral sides and the bottom define a pair of downward extending axially oriented pontoons along the lateral sides, and the pontoons are open to the atmosphere at an upper side thereof. In addition, the amphibious vehicle includes a plurality of wheels mounted to the lateral sides of the body, and a pair of tracks disposed about the wheels.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIG. 6 is an enlarged side view of one of the sprocket wheel assemblies of the amphibious vehicle of FIG. 1;

FIG. 7 is a cross-sectional view of the amphibious vehicle of FIG. 1 taken along section 7-7 in FIG. 6;

FIG. 11 is a cross-sectional view of another amphibious vehicle in accordance with principles described herein.

DETAILED DESCRIPTION OF EXEMPLARY EMBODIMENTS

Figure 1:
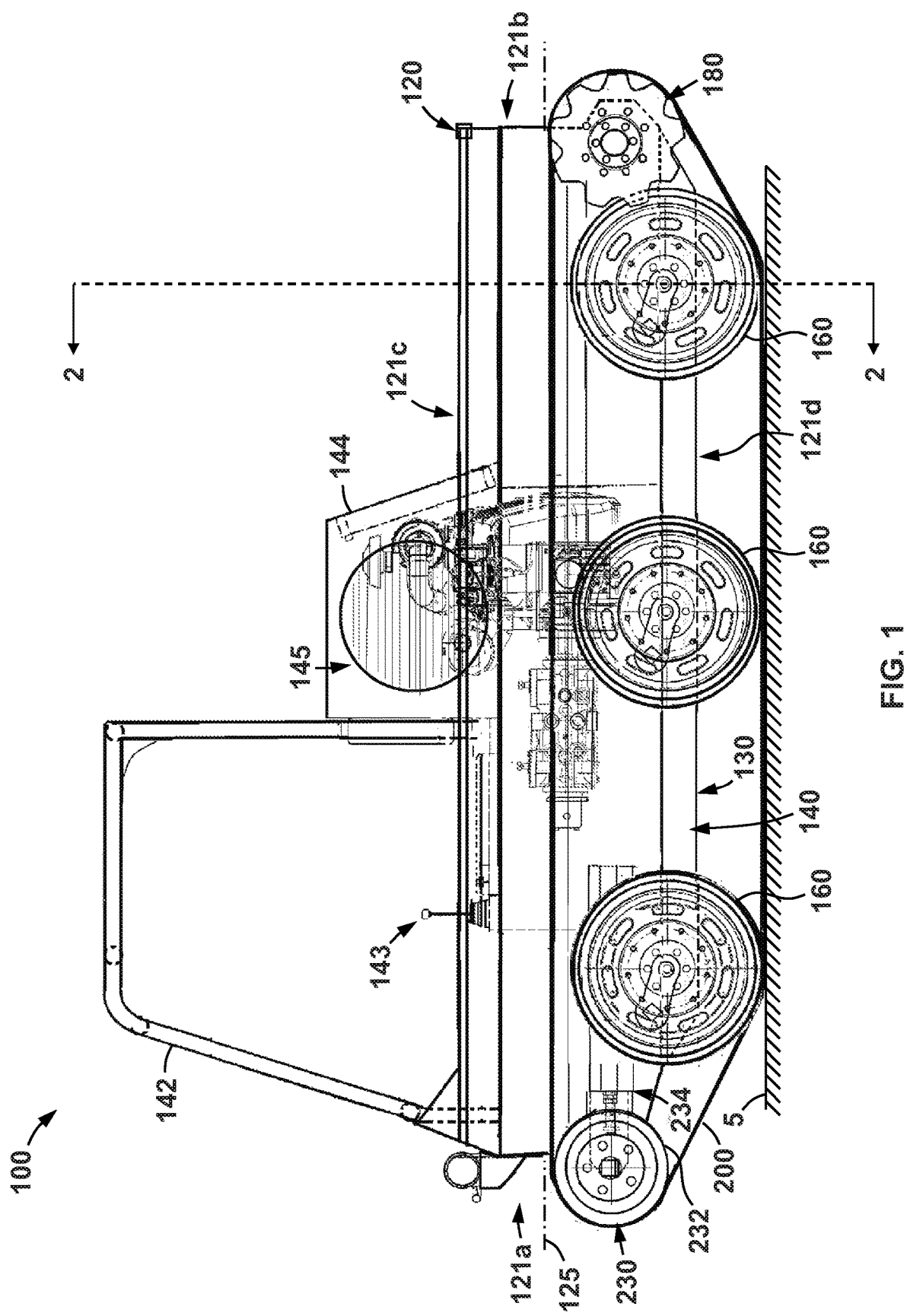
FIG. 1 is a side view of an embodiment of an amphibious vehicle in accordance with principles described herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. The terms "about," "approximately," "substantially," "generally," and the like mean plus or minus 10% of the stated value.

As previously described above, amphibious vehicles may include one or more forms of floatation to prevent the vehicle from sinking when placed within a water environment. In some amphibious vehicles, gas-filled floatation tires are employed for this purpose. However, floatation tires may not be effective for driving forward motion of the vehicle on certain types of terrain. To address this issue, tracks have been placed about the floatation tires. Tracks generally reduce ground pressure and have increased traction. However, placing a track about a floatation tire can lead to so-called "track throw," whereby the track becomes disengaged from the tires. To prevent track throw, the floatation tires are kept properly inflated to ensure sufficient tension on the track. However, if the tire pressure is reduced (e.g., because of a leak, temperature change, etc.), the tension placed on the track may fall below a level sufficient to avoid track throw.

Accordingly, embodiments disclosed herein include amphibious vehicles comprising a buoyant hull that provides flotation to the vehicle. As a result, tracks may be mounted to the body with solid, air-less wheels such that track tension may be more reliably maintained and the risk of undesirable track throw may be reduced.

Referring now to FIG. 1, an embodiment of an amphibious vehicle 100 in accordance with the principles described herein is shown. In this embodiment, vehicle 100 generally includes a body 120, a plurality of wheels 160 rotatably mounted to body 120, and a pair of tracks 200 disposed about the wheels 160.

Figure 2:
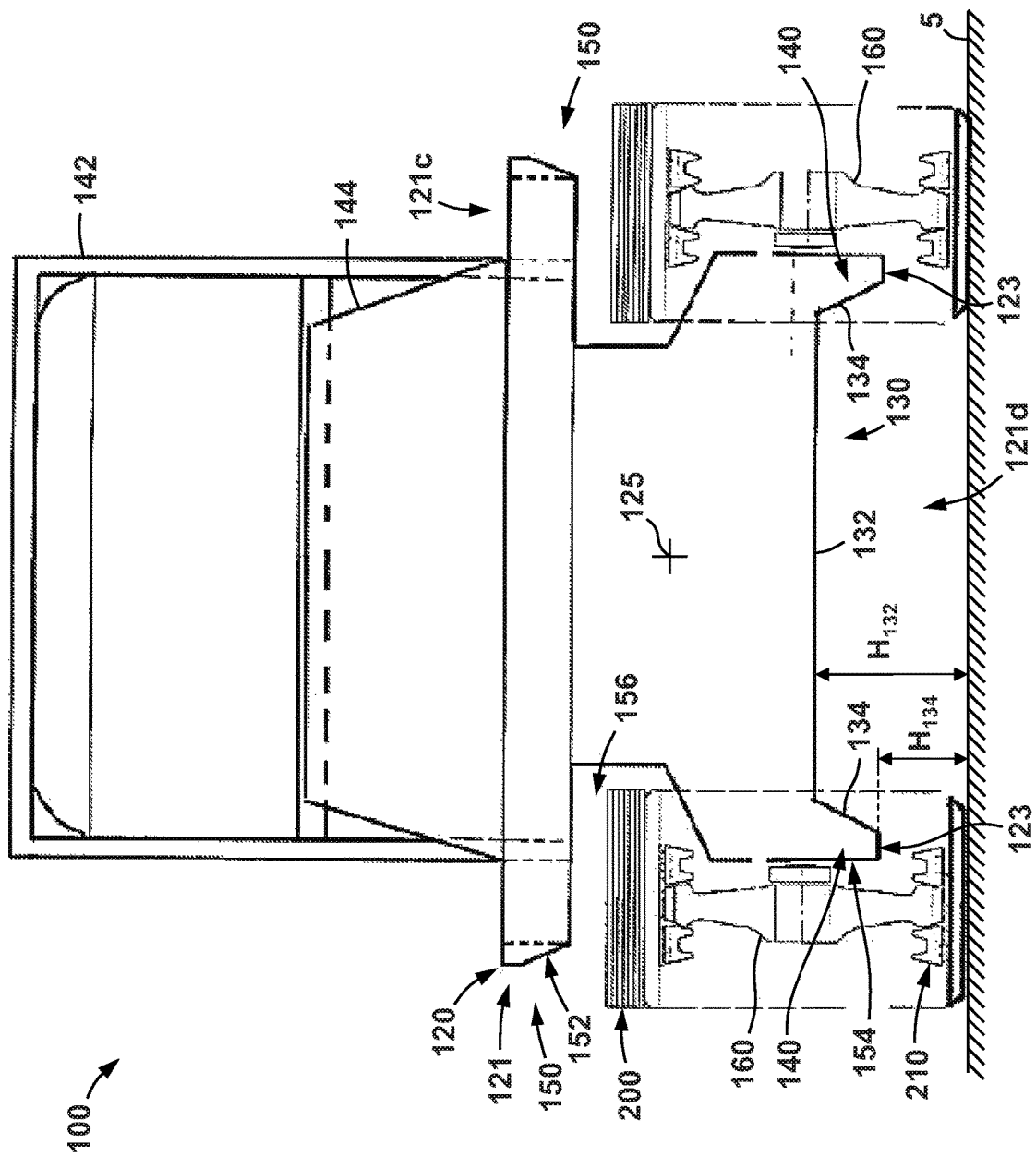
FIG. 2 is a cross-sectional view of the amphibious vehicle of FIG. 1 taken along section 2-2 in FIG. 1.

Referring now to FIGS. 1 and 2, body 120 defines a buoyant hull 121 that includes a central or longitudinal axis 125, a first or front end 121a, and a second or rear end 121b opposite front end 121a. Axis 125 generally extends along the length of body 120 from end 121a to end 121b. In this embodiment, hull 121 includes an open top side 121c and a closed lower side 121d. Closed side 121d is watertight and comprise a bottom 130 and a pair of lateral sides 150. As best shown in FIG. 2, in a cross-section taken in a plane oriented perpendicular to axis 125, bottom 130 includes a planar horizontal surface 132 and a pair of projections 134 extending vertically downward from the planar surface 132. One projection 134 extends vertically downward from each lateral side 150. Planar surface 132 is disposed at a first height $H_{132}$ from the ground 5, while a lower-most surface of each of the projections 134 are disposed at a second height $H_{134}$ from the ground 5 that is less than the first height $H_{132}$.

In the cross-section shown in FIG. 2, each of the lateral sides 150 comprises a first or upper projection 152 extending from open side 121a, a second or lower projection 154 extending from bottom 130, and a recess 156 extending generally radially inward toward axis 125. Recess 156 is vertically positioned between projections 152, 154. The lower projections 154 and the projections 134 on bottom 130 define a pair of downward extending pockets 140 within hull 121. As will be described in more detail below, pockets 140 add additional buoyancy and floatation to body 120 during operations, and thus, pockets 140 may be referred to herein as "pontoons." Thus, pockets 140 (or pontoons) are disposed at lower lateral corners 123 of hull 121.

Referring again to FIGS. 1 and 2, pockets 140 are open to the atmosphere on an upper side via upper open side 121c of hull 121. Thus, the inner surfaces of hull 121 and particularly those surfaces that form pockets 140 may be inspected (e.g., for leaks) from the open upper side 121c of hull 121. In addition, because pockets 140 are open to the atmosphere, flammable gases (e.g., such as those typically found in a marsh environment) may not build within pockets 140.

In some embodiments, pockets 140 may be filled (e.g., wholly, partially, etc.) with foam or other suitable filling materials. However, in this embodiment, pockets 140 are not filled with any materials or foam.

Open top side 121c may receive and support a variety of components of vehicle 100. For instance, as best shown in FIG. 1, a cab 142 is mounted within hull 121 and extends vertically from open top side 121c proximate front end 121a. Cab 142 may provide a place for a driver and/or passenger to sit within vehicle 100. Thus, one or more controls 143 may be disposed within cab 142 so that they may be accessed by a user during operations. In addition, one or more mechanical components (e.g., motors, transmissions, fluid systems, coolant systems, etc.) may be supported on and/or in hull 121. For instance, as shown in FIG. 1, a motor cabinet 144 is disposed within hull 121 adjacent cab 142 that houses a main motor or engine 145. As will be described in more detail below, in some embodiments, main motor 145 may comprise a main hydraulic pump that provides pressurized hydraulic fluid to a plurality of other components or drivers within vehicle 100. However, in other embodiments, main motor 145 may comprise an engine (e.g., an internal combustion engine) that directly drives both tracks 200 (e.g., via a gear train other suitable torque transfer assembly or mechanism).

Figure 4:
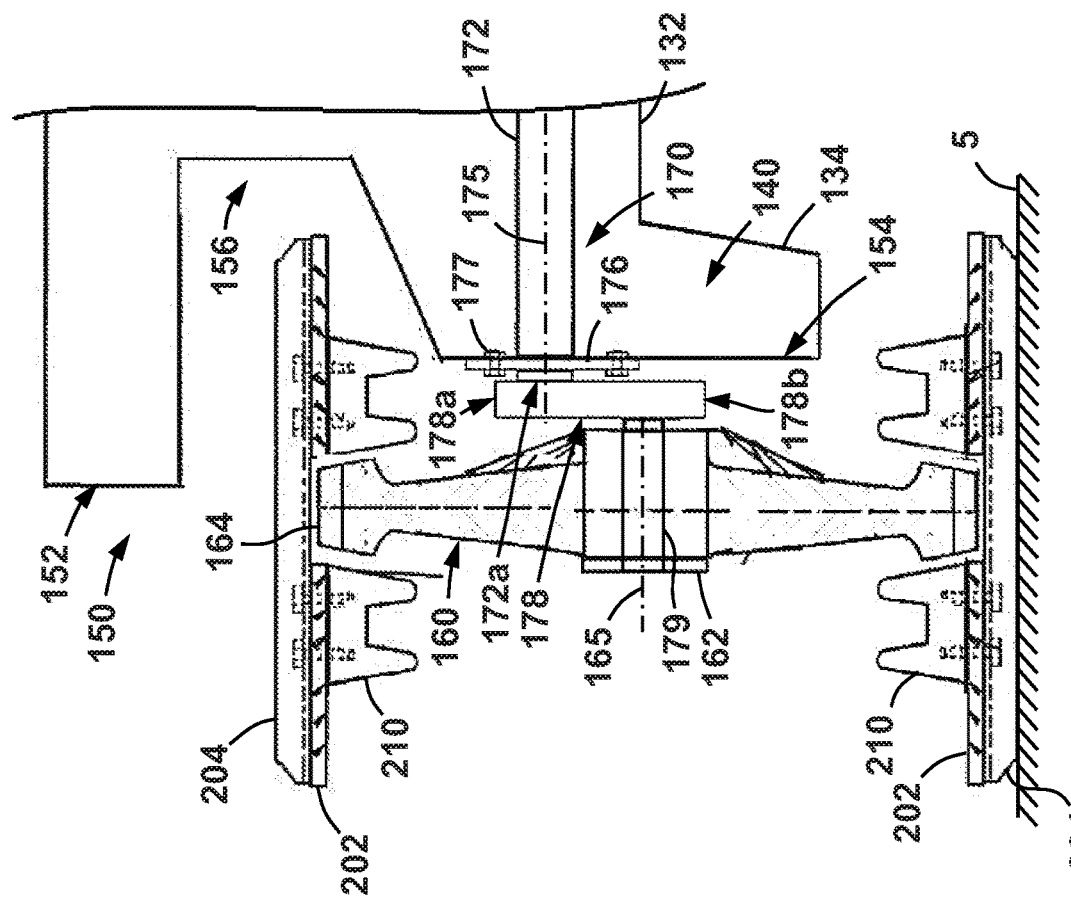
FIG. 4 is an enlarged cross-sectional view of the amphibious vehicle of FIG. 1 taken along section 4-4 in FIG. 3.
Figure 3:
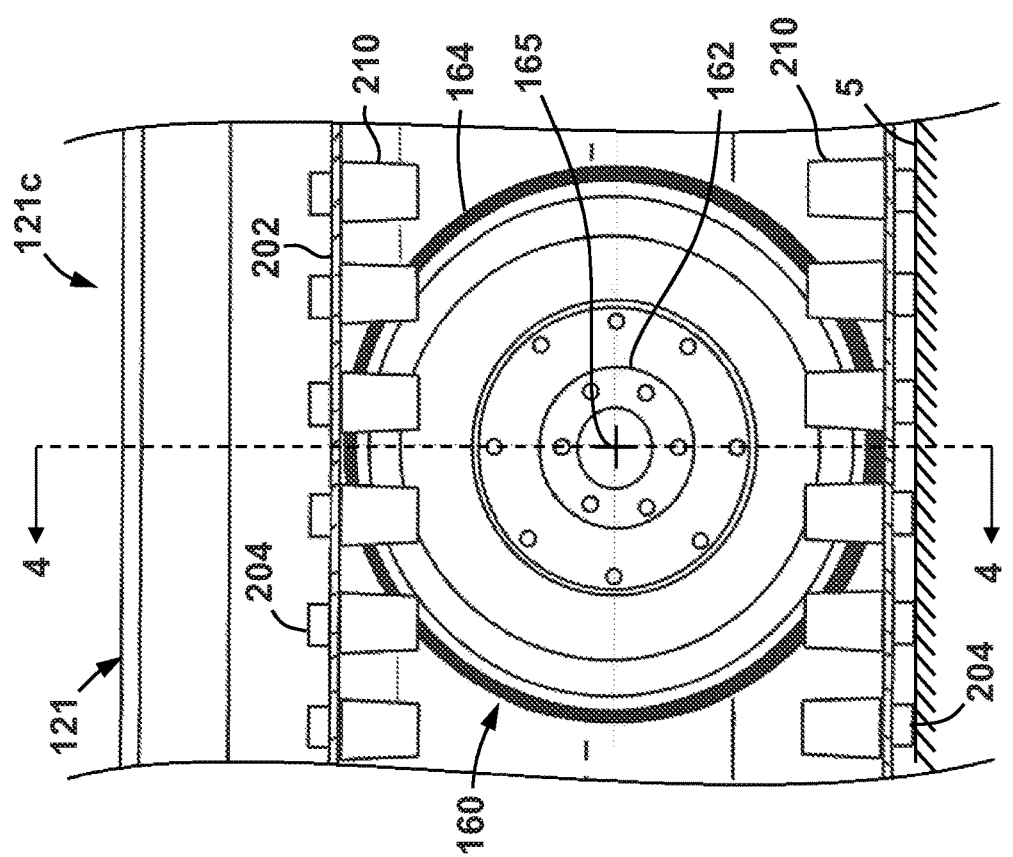
FIG. 3 is an enlarged side view of a wheel of the amphibious vehicle of FIG. 1.
Figure 5:
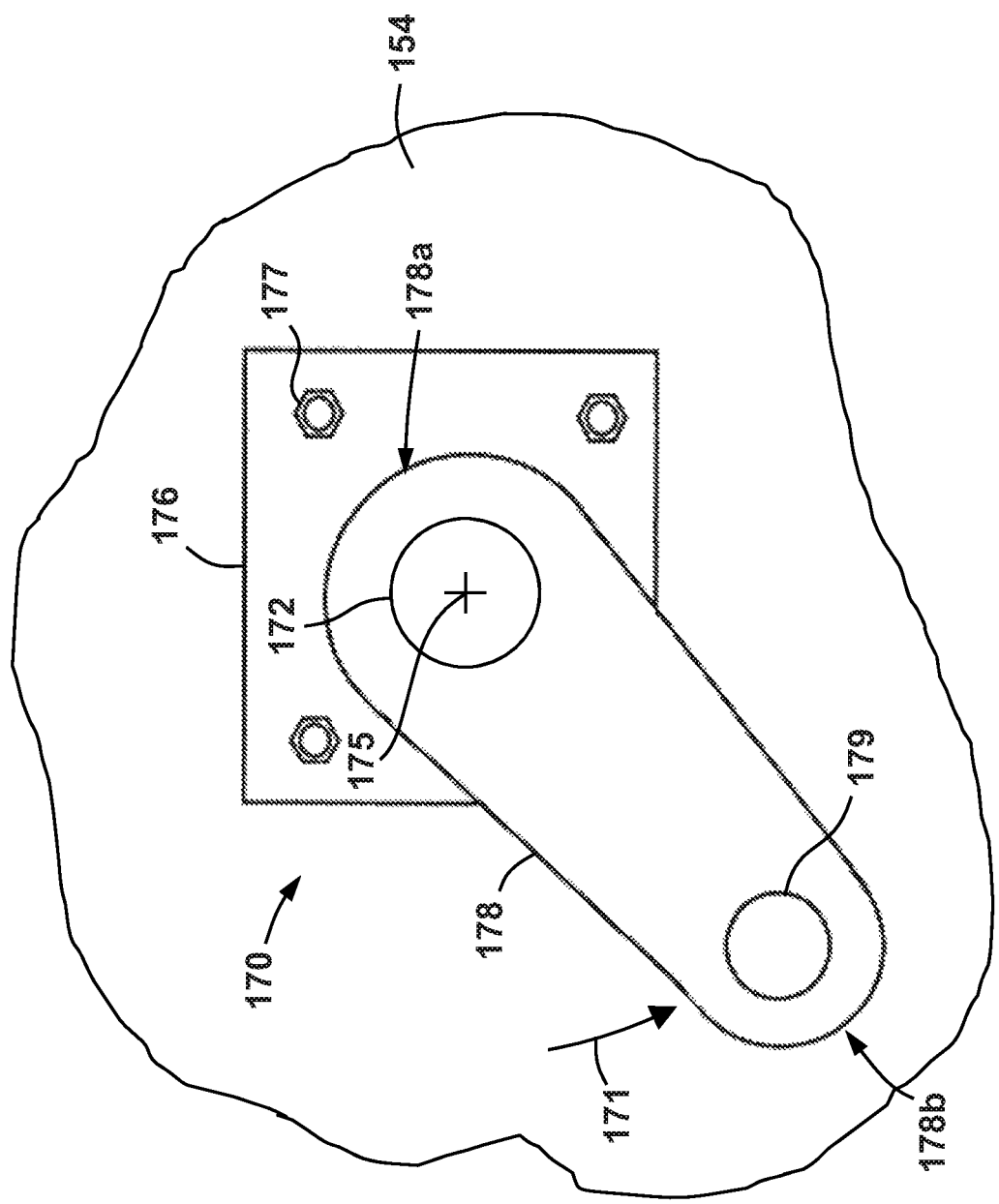
FIG. 5 is an enlarged side view of one of the torsion axle assemblies of the amphibious vehicle of FIG. 1.

Referring now to FIGS. 3-5, each of the wheels 160 comprises a solid, rigid cylindrical disk that includes a central axis 165 (rotational axis), a radially inner hub 162, and a radially outer, circumferential engagement surface 164. Wheels 160 are solid and therefore are generally non-hollow members formed of a rigid material. In this embodiment, wheels 160 are formed from a metallic material (e.g., steel); however, other materials (e.g., rubber, polymer, composite, etc.) are contemplated. Thus, wheels 160 may be referred to herein as "air-less" wheels since they are not inflated with a gas (e.g., such as for a traditional tire).

Wheels 160 are coupled to hull 121 of body 120 at lateral sides 150. In particular, wheels 160 are each coupled to a corresponding torsion axle assembly 170 that is mounted to lower projection 154 on the corresponding lateral side 150. Torsion axle assembly 170 comprises a torsionally biased axle 172 having a central axis 175 that extends through projection 154 of the corresponding lateral side 150 and into hull 121. Axle 172 is mounted to projection 154 via a plate 176 that is secured to projection 154 via one or more bolts 177 or other suitable connection members or mechanisms (e.g., screws, rivets, welding, etc.). An outer end 172a of axle 172 extends outward from hull 121. Thus, axle 172 extends through one of the pockets 140 defined by hull 121. Additionally, suitable sealant or sealing members (e.g., gaskets, caulking, etc. —not shown) are disposed in and about the connection of axle 172 to hull 121 so that hull 121 remains water tight. Axle 172 is rotationally biased about axis 175 by any number of suitable springs or other biasing members (not shown).

A suspension arm 178 is mounted to outer end 172a of axle 172 so that arm 178 is configured to rotate with axle 172 about axis 175 during operations. In particular, suspension arm 178 includes a first end 178a and a second end 178b opposite first end 178a. Suspension arm 178 is mounted to outer end 172a of axle 172 at or proximate first end 178a and second end 178b is extended radially away from first end 178a with respect to axis 175. In addition, a wheel axle 179 is mounted to suspension arm 178 at or proximate to second end 178b.

As best shown in FIGS. 4 and 5, hub 162 of wheel 160 receives wheel axle 179 therein along axis 165 so that axis 165 of wheel 160 is parallel to and radially offset from axis 175 of axle 172. Thereafter, during operations with vehicle 100, the torsional bias provided by axle 172 about axis 175 rotationally biases suspension arm 178 in a counterclockwise direction 171 in the view of FIG. 5 so as to bias wheel 160 toward ground 5 (or downward). In addition, the torsional bias provided by axle 172 may also absorb shocks experienced by wheels 160 during driving of vehicle 100.

Referring back now to FIG. 1, a plurality of sprocket wheel assemblies 180 is mounted to body 120 to drive tracks 200 during operations. In this embodiment, one sprocket wheel assembly 180 is mounted to each lateral side 150 of hull 121 so as to drive rotation of one of the tracks 200. Specifically, each sprocket wheel assembly 180 is mounted proximate to back end 121b of hull 121 along the corresponding lateral side 150.

Referring now to FIGS. 6 and 7, each sprocket wheel assembly 180 includes a plurality of sprocket wheels 182 each including a central hub 184 and a radially outer circumferential surface 185. Radially outer circumferential surface 185 defines a plurality of sprocket teeth 186 and a plurality of radially inwardly extending grooves 187 circumferentially disposed between adjacent sprocket teeth 186. In this embodiment, grooves 187 may have a substantially circular profile as shown in FIG. 6.

As best shown in FIG. 7, each sprocket wheel assembly 180 includes a hydraulic driver 190 mounted within a corresponding one of the pockets 140 along a lateral side 150 of hull 121 (particularly at lower projection 154). Hydraulic driver 190 is fluidly coupled to a pressurized source of hydraulic fluid via one or more hoses 192 (e.g., wherein the source may be the main motor 145 as previously described above). Driver 190 is mounted within the corresponding pocket 140 with an internal mounting plate or bracket 194 and an output shaft assembly 196 extends outward from pocket 140 along a central axis 195. Output shaft assembly 196 is coupled to a pair of sprocket wheels 182 that are axially spaced along axis 195. Sprocket wheels 182 may be mounted to shaft assembly 196 such that as shaft assembly 196 is rotated about axis 195 by riverdriver 190 during operations, sprocket wheels 182 are also rotated about axis 195. In this embodiment, sprocket wheels 182 are mounted to output shaft assembly 196 via a plurality of bolts 197 or other suitable securing members or mechanisms (e.g., screws, rivets, welding, etc.).

During operations, hydraulic driver 190 is actuated (e.g., via a supply of pressurized hydraulic fluid) to rotate output shaft assembly 196 about axis 195 to thereby also rotate sprocket wheels 182 about axis 195. As will be described in more detail below, the rotation of sprocket wheels 182 about axis 195 drives tracks 200 over wheels 160, and thereby propels vehicle 100 relative to ground 5 (see FIG. 1). By using a dedicated hydraulic driver 190 for each of the tracks 200 that is mounted within open pockets 140 (which is open to atmosphere via open top side 121c of hull 121 as previously described), access for repair, inspection, and maintenance is enhanced so that drivers 190 may more reliably operate within vehicle 100 over time. Also, additional drive chains and gears may be avoided since hydraulic drivers 190 are directly coupled to the shaft assembly 196 engaged with sprocket wheels 182.

It should be appreciated that in other embodiments, hydraulic drivers 190 may be replaced with electrical or other suitable driver (e.g., internal combustion engines). Also, in other embodiments, a single driver or motor is utilized that drives rotation of each of the shaft assemblies 196 via a suitable gear train or other torque transfer assembly or mechanism (e.g., main motor 145 shown in FIG. 1).

Referring now to FIGS. 1, 3, 4, 6, and 7, tracks 200 each comprise a pair of continuous belts that are joined to one another with a plurality of engagement cleats 204. As best shown in FIG. 4, track 200 is disposed over wheels 160 such that wheels 160 are disposed between belts 202 and circumferentially outer surface 164 engages with cleats 204. In addition, cleats 204 are disposed along an outer side of the belts 202 so that cleats 204 engage with ground 5 and therefore provide traction to vehicle 100 during operations. In some embodiments, belts 202 may comprise a resilient material, such as, for example, rubber.

In addition, a plurality of track guides 210 are mounted to an inner side of belts 202 that are to engage with sprocket wheels 182 during operations. Specifically, referring now to FIGS. 8 and 9, each track guide 210 includes a base 212, and an engagement member 214 mounted to base 212. Base 212 may comprise any suitable material, such as for example, a metallic material. In addition, engagement member 214 may also comprise a metallic material in some embodiments; however, in other embodiments, engagement member 214 may comprise a non-metallic material, such as, for example, rubber, urethane, a polymer, a composite, etc. In this embodiment, engagement member 214 is formed of a moldable material (which means a material that may form a desired shape through a suitable molding operation, such as, for example, injection molding, press molding, etc.). In particular, in some embodiments, engagement member 216 may be directly molded onto base 212. However, in other embodiments, engagement member 216 may be secured to base 212 via bolts (e.g., bolts 224 described in more detail below) either in lieu of or in addition to molding engagement member 216 onto base 212.

Engagement member 214 includes a pair of projections 216 forming a recess 218 therebetween. A sprocket engagement surface 220 is disposed within recess 218 and extends between projections 216. Each of the projections 216 includes an inner guide surface 217 that are ramped or inclined so as to converge toward one another when moving toward sprocket engagement surface 220. In addition, projections 216 include a pair of wear surfaces 219 disposed on outside recess 218 that diverge away from one another when moving toward base 212. Sprocket engagement surface 220 includes an arcuate profile that is to engage with the grooves 187 between the teeth 186 of sprocket wheels 182 during operations (see FIG. 6). In this embodiment, the arcuate profile of engagement surface 220 is circular in so that engagement surface 220 is generally cylindrical in shape.

Figure 8:
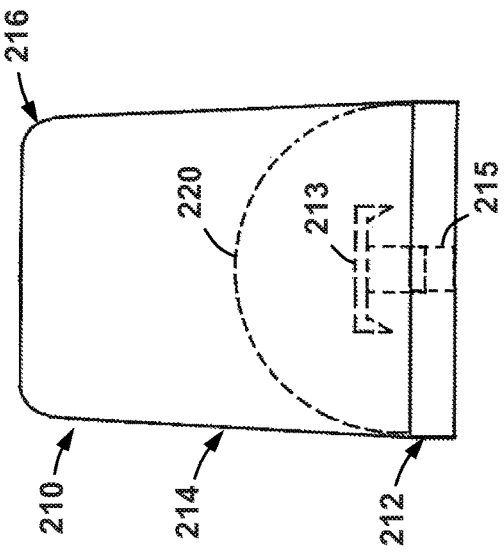
FIG. 8 is a front view of one of the track guides of the amphibious vehicle of FIG. 1.
Figure 9:
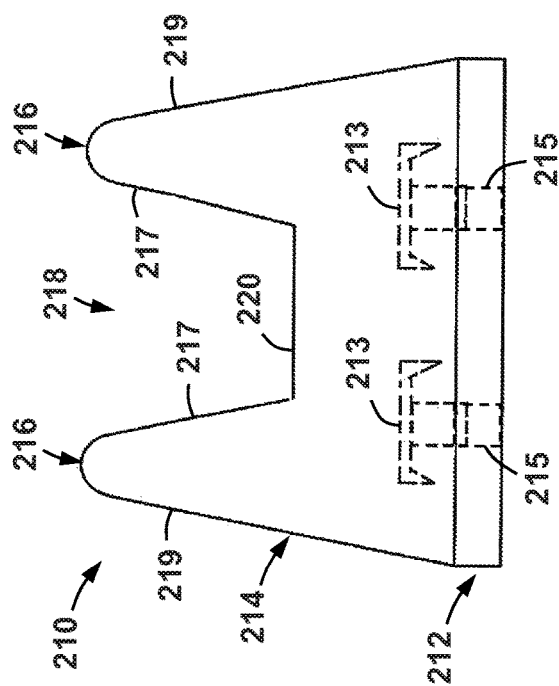
FIG. 9 is a side view of the track guide of FIG. 8.
Figure 10:
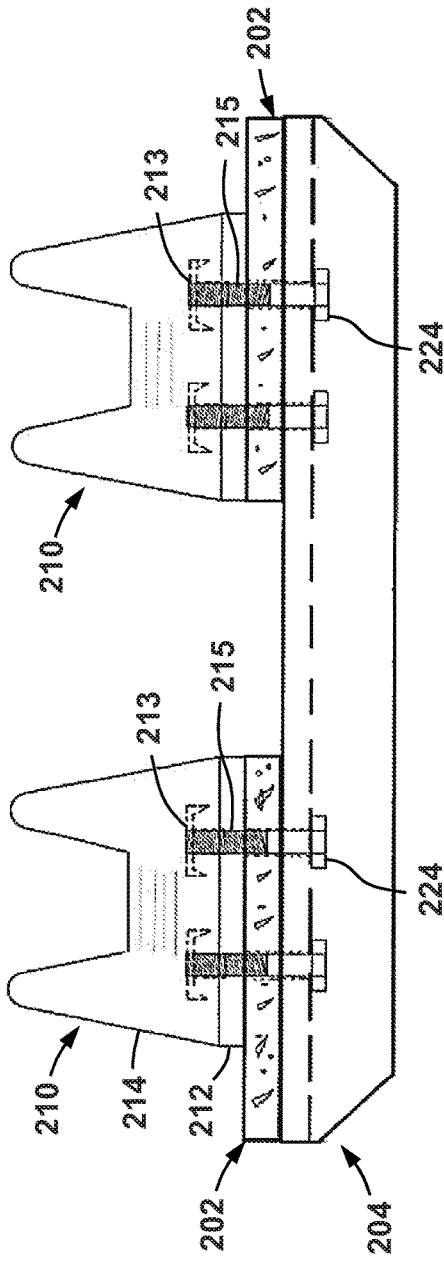
FIG. 10 is a side view of two of the track guides of FIG. 8 mounted to a cleat of the track of the amphibious vehicle of FIG. 1.

Referring still to FIGS. 8 and 9, a pair of engagement nuts 213 are embedded within engagement member 214 that are aligned with corresponding mounting apertures 215 extending through base 212. Referring now to FIG. 10, track guides 210 are mounted to an inner side of belts 202, or a side opposite the cleats 204, by inserting bolts 224 through cleats 204, belts 202, and apertures 215 in bases 212, so that bolts 224 are then threadably engaged within engagement nuts 217 embedded within engagement members 216. Thus, in this embodiment, bolts 224 may secure both cleats 204 and track guides 210 to belts 202.

Referring now to FIGS. 1 and 6-10, during operations, track 200 is disposed about wheels 160 and sprocket wheels 182 so that grooves 187 on outer circumferential surfaces 185 of sprocket wheels 182 engage with engagement surfaces 220 on track guides 210. Thereafter, when sprocket wheels 182 are rotated about corresponding axes 195, track 200 is also actuated or driven via the engagement between sprocket wheels 182 and track guides 210 so as to propel vehicle 100 relative to ground 5. The projections 216 may encourage continued engagement between engagement surface 220 and outer circumferential surface 185 of sprocket wheels 182 during these operations. Specifically, the ramped guide surfaces 217 may slidingly engage with outer circumferential surfaces 185 to thereby guide sprocket wheel 182 into continued engagement with engagement surface 220 on track guides 210.

Referring back to FIG. 1, a track tension assembly 230 is also mounted to each lateral side 150 of hull 121 so as to provide a desired tension to tracks 200 during operations. Track tension assembly 230 includes a tension wheel 232 that is actuated by a linear actuator 234 mounted within or along hull 121. Wheel 232 is engaged with an inner side of track and is actuated axially toward front end 121a of hull 121 along axis 125. In some embodiments, linear actuator 234 may selectively actuate wheel 232 toward front end 121a (e.g., via a hydraulic, electric, or other suitable driver). In other embodiments, linear actuator 234 may bias (e.g., via a spring or other suitable device) wheel 232 toward front end 121a. In either case, wheel 232 imparts a tension or stretch to track 200 so as to encourage engagement between track 200 and sprocket wheels 182 as well as wheels 160.

Referring again to FIGS. 1 and 2, during operations, vehicle 100 may be driven along the ground 5 by rotation of track 200 via sprocket wheel assemblies 180 as previously described. During this process, vehicle 100 may drive through a wet environment (e.g., a marsh, standing water, a pond, a river, a stream, etc.) so that water may be disposed between body 120 (e.g., particular bottom 130 of hull 121) and the ground 5. However, hull 121 defines pockets 140 along lateral sides 150 that are lower than other portions of hull 121 as previously described, As a result, the pockets 140 provide floatation and buoyancy to hull 121 even for relatively shallow waters (e.g., waters that are deeper than height $H_{134}$, but shallower than height $H_{132}$ in FIG. 2). Thus, pockets 140 may provide sufficient buoyancy to vehicle 100 so as to prevent vehicle 100 from sinking in deep water during operations.

In addition, the floatation and buoyancy provided by pockets 140 also allows the use of rigid airless wheels (e.g., wheels 160, sprocket wheels 182), so that tension is more reliably imparted to track 200 during operations. As a result, the risk of track throw is significantly reduced during operations with vehicle 100. In addition, track throw is also discouraged by the engagement of guide surfaces 217 on projections 216 of track guides 210 with radially outer surfaces 185 of sprocket wheels 182 as previously described above.

Further, by extending pockets 140 downward along bottom 130 of hull 121, additional floatation and buoyancy is imparted to vehicle 100 without substantially increasing a width thereof. As a result, the weight of vehicle 100 may be maintained (in some embodiments) below a limit to allow for transportation of vehicle 100 by helicopter (e.g., to remote locations). For example, in some embodiments, vehicle 100 may weigh less than approximately 3000 lbs., such as less than or equal to approximately 2500 lbs. Also, in at least some embodiments, the floatation and buoyancy provided by hull 121 (e.g., pockets 140) may allow vehicle 100 to float not only its own weight but also an additional cargo that may weigh approximately 700 lbs. in some embodiments.

Accordingly, the embodiments disclosed herein may improve the reliability and function of an amphibious vehicle. In particular, the embodiments disclosed herein may prevent track throw and may enhance the buoyancy of such vehicles when they are driven over wet or submerged environments.

As shown in FIG. 2, embodiments disclosed herein have included an integral pocket 140 that is formed by the lateral sides 150 and bottom 130 (e.g., particularly projections 134) of hull 121. In other embodiments, separate pontoons may be mounted to the bottom of the hull 121. For example, referring now to FIG. 11, another vehicle 300 is shown. Vehicle 300 is substantially the same as vehicle 100 previously described, and thus, like features are identified with like reference numerals, and the discussion below will concentrate on the features of vehicle 300 that are different from vehicle 100. In particular, on vehicle 300 planar surface 132 extends between lateral sides 150, and extensions 134 are omitted. Rather, additional pontoon members 334 are mounted to planar surface 132 in place of projections 134 to form pockets or pontoons 340 in place of pockets 140 previously described. In this embodiment, pockets 340 are sealed from the atmosphere since they are mounted onto the closed bottom 130 of body 120. However, pockets 340 provide similar buoyancy and floatation functionality to vehicle 300 as described above for vehicle 100 (see e.g., FIG. 2). Pontoons 340 may be secured to planar surface 132 in any suitable manner, such as, for example, welding, bolts, rivets, etc. In this embodiment, pontoons 340 are welded to planar surface 132.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:
1. An amphibious vehicle, comprising:
a body that defines a buoyant hull, wherein the buoyant hull comprises:
an open top;
a closed bottom; and
a pair of lateral sides, wherein each lateral side extends from the closed bottom to the open top;
wherein the closed bottom extends downward at the pair of lateral sides to form a pair of pockets, wherein each pocket is open to atmosphere through the open top and is closed at a lower end by the closed bottom;
a plurality of wheels mounted to the pair of lateral sides of the body; and
a pair of tracks disposed about the plurality of wheels.

2. The amphibious vehicle of claim 1, wherein the plurality of wheels comprise a plurality of solid wheels.

3. The amphibious vehicle of claim 2, wherein each of the plurality of solid wheels is mounted to a corresponding one of the pair of lateral sides with a torsion axle assembly, wherein for each solid wheel of the plurality of solid wheels, the torsion axle assembly is configured to bias the solid wheel downward.

4. The amphibious vehicle of claim 3, wherein each torsion axle assembly comprises:
a torsionally biased axle;
a suspension arm having a first end and a second end opposite the first end, wherein the suspension arm is coupled to the torsionally biased axle proximate the first end; and
a wheel axle coupled to the suspension arm proximate the second end, wherein the wheel axle is rotatably coupled to a corresponding one of the solid wheels.

5. The amphibious vehicle of claim 1, wherein the plurality of wheels comprises a plurality of sprocket wheels; and
wherein the amphibious vehicle comprises a plurality of drivers mounted within the hull, wherein each of the plurality of drivers is coupled to a corresponding sprocket wheel.

6. The amphibious vehicle of claim 5, wherein the plurality of drivers comprise hydraulic motors.

7. The amphibious vehicle of claim 6, wherein each of the tracks comprises a belt, and a plurality of drive guides mounted to the belt,
wherein each of the drive guides comprises:
a pair of projections defining a recess therebetween;
wherein the pair of projections include a pair of guide surfaces that converge toward one another to a cylindrical engagement surface within the recess;
wherein each of the drive sprockets comprise plurality of teeth, and wherein the cylindrical engagement surface of each of the drive guides is configured to engage between a pair of the plurality of teeth on a corresponding one of the drive sprockets.

8. An amphibious vehicle, comprising:
a body that defines a buoyant hull comprising:
an open top side;
a closed bottom; and
a pair of lateral sides extending between the open top side and the closed bottom;
wherein the closed bottom includes a planar surface and a pair of projections extending downward from the planar surface, wherein each of the pair of projections is disposed at the pair of lateral sides;
a plurality of wheels mounted to the pair of lateral sides of the body; and
a pair of tracks disposed about the plurality of wheels.

9. The amphibious vehicle of claim 8, wherein the plurality of wheels comprise a plurality of solid wheels.

10. The amphibious vehicle of claim 9, wherein each of the plurality of solid wheels are mounted to corresponding one of the pair of lateral sides with a torsion axle assembly, wherein for each solid wheel of the plurality of solid wheels, the torsion axle assembly is configured to bias the solid wheel downward.

11. The amphibious vehicle of claim 10, wherein each torsion axle assembly comprises:
a torsionally biased axle;
a suspension arm having a first end and a second end opposite the first end, wherein the suspension arm is coupled to the torsionally biased axle proximate the first end; and
a wheel axle coupled to the suspension arm proximate the second end, wherein the wheel axle is rotatably coupled to a corresponding one of the solid wheels.

12. The amphibious vehicle of claim 8, wherein the plurality of wheels comprises a plurality of sprocket wheels; and
wherein the amphibious vehicle comprises a plurality of drivers mounted within the hull, wherein each of the plurality of drivers is coupled to a corresponding sprocket wheel.

13. The amphibious vehicle of claim 12, wherein the plurality of drivers comprise hydraulic motors.

14. The amphibious vehicle of claim 13, wherein each of the tracks comprises a belt, and a plurality of drive guides mounted to the belt,
wherein each of the drive guides comprises:
a pair of projections defining a recess therebetween;
wherein the pair of projections include a pair of guide surfaces that converge toward one another to a cylindrical engagement surface within the recess;
wherein each of the drive sprockets comprise plurality of teeth, and wherein the cylindrical engagement surface of each of the drive guides is configured to engage between a pair of the plurality of teeth on a corresponding one of the drive sprockets.

15. An amphibious vehicle, comprising:
a body having a longitudinal axis, a pair of lateral sides, and a bottom extending between the pair of lateral sides, wherein the pair of lateral sides and the bottom define a pair of downward extending axially oriented pontoons along the pair of lateral sides, and wherein the pair of downward extending axially oriented pontoons are open to atmosphere at an upper side thereof;
a plurality of wheels mounted to the pair of lateral sides of the body; and
a pair of tracks disposed about the plurality of wheels.

16. The amphibious vehicle of claim 15, wherein the plurality of wheels comprise a plurality of solid wheels.

17. The amphibious vehicle of claim 16, wherein each of the plurality of solid wheels is mounted to a corresponding one of the pair of lateral sides with a torsion axle, wherein for each solid wheel of the plurality of solid wheels, the torsion axle assembly is configured to bias the solid wheel downward.

18. The amphibious vehicle of claim 17, wherein each torsion axle assembly comprises:
a torsionally biased axle;
a suspension arm having a first end and a second end opposite the first end, wherein the suspension arm is coupled to the torsionally biased axle proximate the first end; and
a wheel axle coupled to the suspension arm proximate the second end, wherein the wheel axle is rotatably coupled to a corresponding one of the solid wheels.

19. The amphibious vehicle of claim 15, wherein the plurality of wheels comprises a plurality of sprocket wheels; and
wherein the amphibious vehicle comprises a plurality of drivers mounted within the hull, wherein each of the plurality of drivers is coupled to a corresponding sprocket wheel.

20. The amphibious vehicle of claim 19, wherein the plurality of drivers comprise hydraulic motors.

21. The amphibious vehicle of claim 20, wherein each of the tracks comprises a belt, and a plurality of drive guides mounted to the belt,
   wherein each of the drive guides comprises:
      a pair of projections defining a recess therebetween;
      wherein the pair of projections include a pair of guide surfaces that converge toward one another to a cylindrical engagement surface within the recess;
      wherein each of the drive sprockets comprise plurality of teeth, and wherein the cylindrical engagement surface of each of the drive guides is configured to engage between a pair of the plurality of teeth on a corresponding one of the drive sprockets.

\* \* \* \* \*